United States Patent [19]
Weidinger

[11] Patent Number: 5,645,152
[45] Date of Patent: Jul. 8, 1997

[54] FRICTION CLUTCH WITH ADJUSTMENT FOR WEAR

[75] Inventor: Reinhold Weidinger, Unterspiesheim, Germany

[73] Assignee: Fichtel & Sachs AG, Schweinfurt, Germany

[21] Appl. No.: 541,628

[22] Filed: Oct. 10, 1995

[30] Foreign Application Priority Data

Oct. 10, 1994 [DE] Germany ............................ 44 36 111.4

[51] Int. Cl.⁶ .................................................. F16D 13/75
[52] U.S. Cl. ...................... 192/70.25; 192/89.23; 192/89.24; 192/111 A
[58] Field of Search .................... 192/70.25, 111 A, 192/89.23, 89.24

[56] References Cited

U.S. PATENT DOCUMENTS

| | | |
|---|---|---|
| 3,758,094 | 9/1973 | Crutchley et al. |
| 5,400,887 | 3/1995 | Mizukami et al. ............... 192/89.23 |
| 5,419,418 | 5/1995 | Uenohara et al. ............... 192/70.25 |
| 5,450,934 | 9/1995 | Maucher ........................... 192/70.25 |

FOREIGN PATENT DOCUMENTS

| | | |
|---|---|---|
| 2424442 | 11/1979 | France. |
| 1294229 | 4/1969 | Germany. |
| 4322677 | 1/1994 | Germany. |
| 2261922 | 6/1993 | United Kingdom. |
| 2273751 | 6/1994 | United Kingdom. |
| 2280001 | 1/1995 | United Kingdom. |
| 2284025 | 5/1995 | United Kingdom. |

*Primary Examiner*—Rodney H. Bonck
*Attorney, Agent, or Firm*—Nils H. Ljungman and Associates

[57] ABSTRACT

A friction clutch with a plate spring and a mechanism to compensate for wear of the friction linings, whereby there is a disengagement element approximately in the form of a membrane spring which exerts a lifting force on the plate spring or the application plate, with the interposition of the wear compensation mechanism. The wear compensation mechanism includes at least one ring-shaped component to which torque is applied by a spring force, and which has inclined partial surfaces on its circumference which engage in corresponding opposite surfaces.

13 Claims, 9 Drawing Sheets

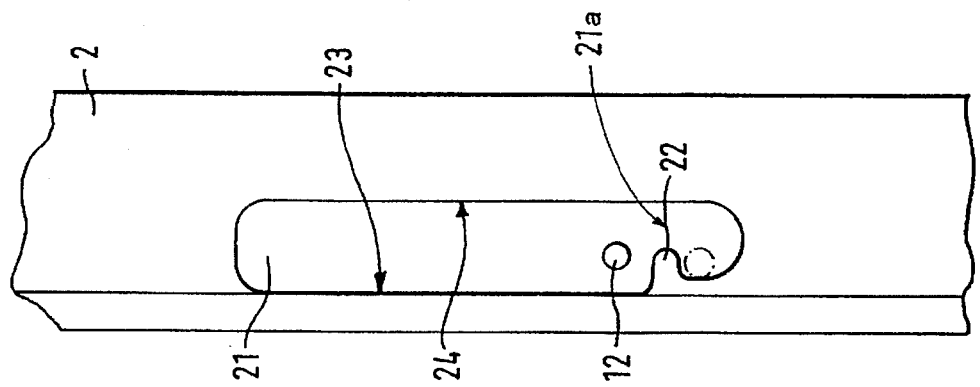
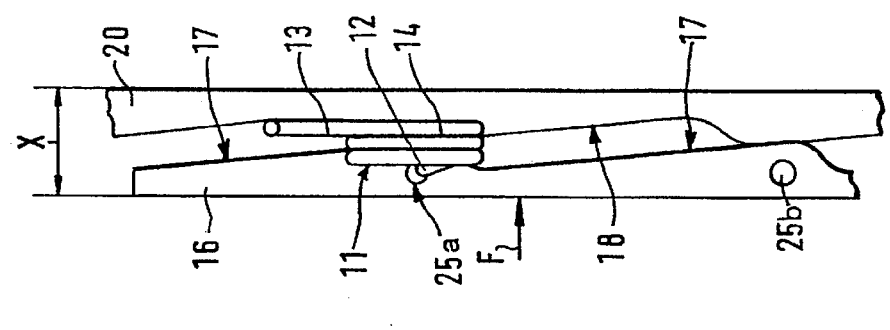
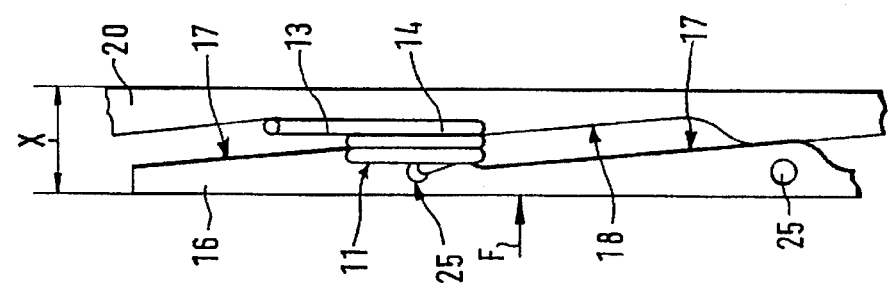

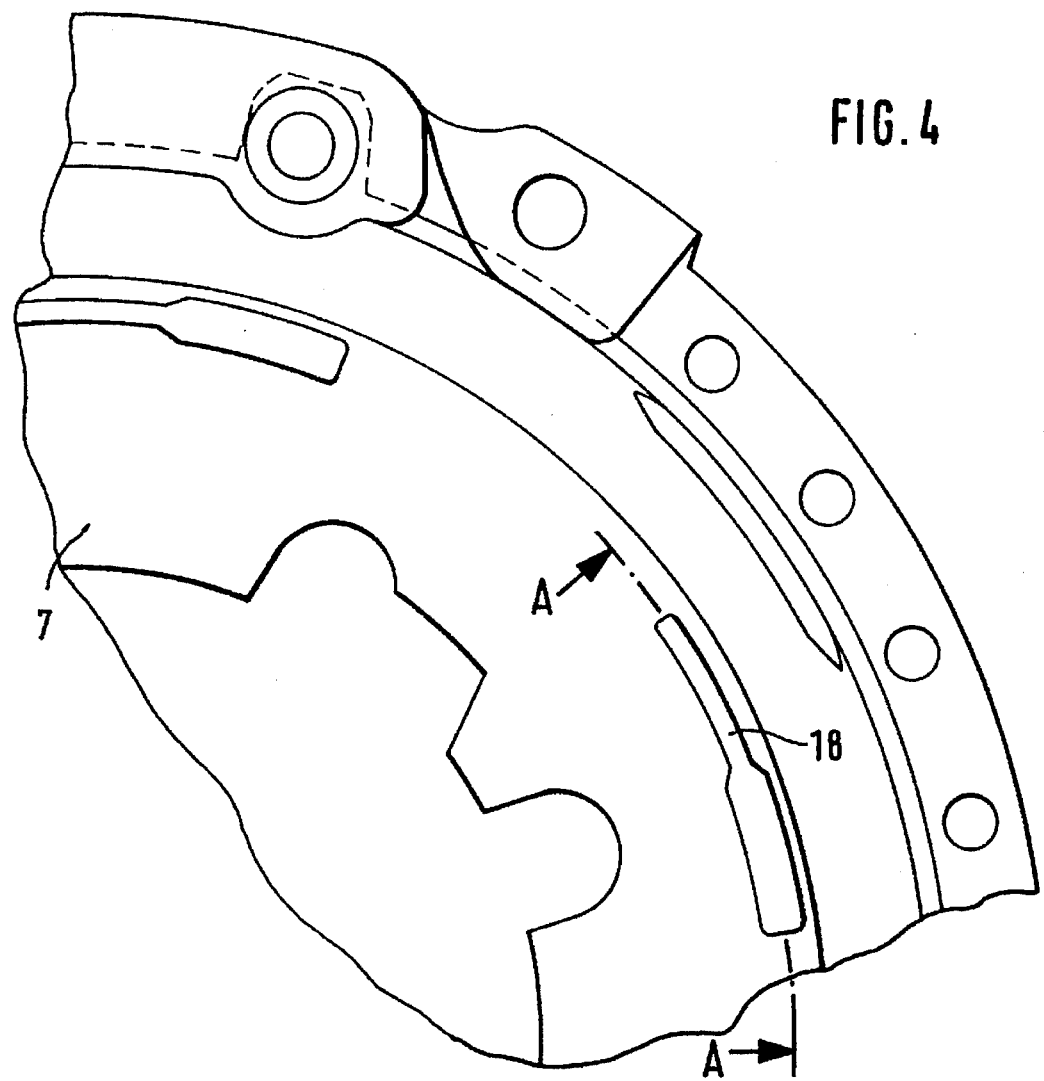
FIG. 4
FIG. 4a
A-A
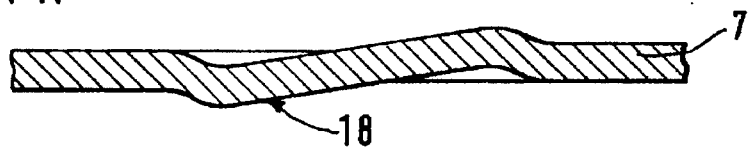

FRICTION CLUTCH WITH ADJUSTMENT FOR WEAR

BACKGROUND OF THE INVENTION

1. Field of the Invention

The present invention generally relates to a friction clutch for an internal combustion engine, which friction clutch includes a clutch plate. The clutch plate can be brought into frictional engagement against a flywheel, by means of an application plate, whereby a separate disengagement element can be used for the actuation of the friction clutch, and the application force can be generated by a plate spring.

2. Background Information

A friction clutch of the type described above is disclosed, for example, in German Unexamined Patent Application 1 294 229. In such a conventional friction clutch, there is a plate spring which is supported on one hand on the clutch housing, and on the other hand on the application plate. The friction clutch is actuated by means of a set of disengagement levers which are distributed around the circumference, and which disengagement levers neutralize the force of the plate spring during the disengagement process.

As the wear on the friction linings of the clutch plate increases, the application plate travels toward the flywheel, and consequently, the position of the disengagement elements also changes.

OBJECT OF THE INVENTION

The object of the present invention, on a clutch with a plate spring, is to create a mechanism which can essentially guarantee that the disengagement elements retain, or at least approximately retain, their position relative to the disengagement system over the useful life of the clutch linings.

SUMMARY OF THE INVENTION

The present invention teaches that this object can be accomplished by means of a disengagement element, which disengagement element can be approximately in the form of a membrane spring with slots, which slots can extend radially. The disengagement element, in the form of a membrane spring, can be supported on one hand on the clutch housing, and on the other hand with the interposition of a wear compensation mechanism. The disengagement element can apply a pressure force to the application plate. A load can be applied in the radially inner area of the disengagement element, by a disengagement system, whereby the curve of the pressure force, when wear occurs, can decrease as the wear increases. The wear compensation mechanism can thereby effect a force-dependent reduction of the distance between the disengagement element and the application plate.

The present invention teaches that, as a result of the design of the friction clutch, it can be possible to keep the relative position of the disengagement element and of the entire disengagement system essentially constant in relation to the clutch. The travel available on the clutch pedal can thereby be optimally utilized at essentially all times. It is therefore essentially unnecessary to have an adjustment mechanism between the clutch pedal and the disengagement system, which can thereby essentially simplify the vehicle service and maintenance procedures. And, as a result of the essentially constant disengagement travel in the axial direction, the disengagement element can be designed such that it can be relatively compact.

It is an additional advantageous feature of the present invention that the friction clutch can be designed as a pushed clutch.

The wear compensation mechanism can be effectively located between the disengagement element and the application plate, and the pressure force applied to the application plate can act in the lifting direction. Thus, it can be possible to easily orient or install the disengagement element, and to hold the disengagement element in place by internal stress.

The present invention also teaches that the wear compensation mechanism can include at least one ring-shaped component, which ring-shaped component can be oriented concentric with respect to the axis of rotation. Along the circumference of the ring-shaped component, there can preferably be partial surfaces, which partial surfaces can create an ascending gradient. The partial surfaces can interact with corresponding opposite surfaces. A spring mechanism can thereby apply a load or force to the ring-shaped component, toward the opposite surfaces in the circumferential direction, to thereby reduce the axial distance between the partial surfaces and the corresponding opposite surfaces. Such an arrangement can save space inside the friction clutch, since as the wear of the friction linings essentially increases, the arrangement can take up less and less axial space.

In accordance with an additional embodiment of the present invention, the disengagement element can be supported, on one hand, at an intermediate diameter of the disengagement element, by means of spacer bolts or similar devices, which spacer bolts can be fastened to the clutch housing. The disengagement element can be supported, on the other hand, in the vicinity of the outside diameter of the disengagement element, on the ring-shaped component. The opposite surfaces for the wear compensation mechanism can thereby be made in an additional ring-shaped component, which additional ring-shaped component can be supported on the application plate, or, alternatively, on the plate spring. However, it can also be possible to locate the opposite surfaces directly on the application plate, thereby essentially eliminating the need for an additional component. Alternatively, the opposite surfaces can be located directly on the plate spring, whereby the plate spring can have a dual function.

The present invention also teaches that the plate spring can be in contact, by means of the inside diameter of the plate spring, with the clutch housing. In addition, the plate spring can be in contact, at the outside diameter of the plate spring, with the application plate. The disengagement element can also be in contact, at an intermediate diameter of the disengagement element, by means of spacer bolts, with the clutch housing. The outside diameter of the disengagement element can also be in contact, by means of the ring-shaped component, with the plate spring. The area of contact between the disengagement element and the plate spring can preferably be in a diameter area, which diameter area is preferably near, and radially inside, the point of contact between the plate spring and the application plate. This arrangement can make a compact construction possible.

The present invention teaches that the spring mechanism can include several torsion springs, which torsion springs can be distributed around the circumference. One leg of the torsion springs can be supported on the clutch housing, and the other leg of the torsion springs can apply a flexible load to the circumference of the ring-shaped component. The ring-shaped component can thereby be displaced rotationally with respect to the axis of rotation. However, it can also be possible, without essentially any additional measures, to provide several torsion springs distributed over the circumference, each of which torsion springs—when two ring-shaped components are used—can be engaged, by means of their legs, in one ring-shaped component or the other ring-shaped component.

The present invention also teaches that the torsion springs can be fixed, with their flexible coils, in the vicinity of the spacer bolts for the actuator element. The torsion springs can, alternatively, be offset circumferentially and the leg, which leg can apply a lead to the ring-shaped component, can be extended radially outward, beyond the point of attachment of the leg to the ring-shaped component. The leg can extend through and can penetrate an opening in the clutch housing, which opening in the clutch housing can preferably be of sufficient circumferential size in the clutch housing. The leg can be fixed there in a first position during the assembly procedure, to take the load off the ring-shaped component. In this manner it can essentially be guaranteed that, during the process of assembling and installing the friction clutch, essentially no force is able to act on the ring-shaped component, since otherwise the ring-shaped component would be displaced such that the ring-shaped component could reach a position at the least axial distance whereby the adjustment device could not be actuated with new friction linings.

It is an additional feature of the present invention that the fixing of the position of the leg of the torsion spring can be accomplished by means of a lug in the opening of the clutch housing. The lug can extend from the flywheel-side delimitation of the opening, in the axial direction, to the opposite delimitation, whereby, during the initial actuation of the clutch, the leg of the torsion spring can snap over the lug. The leg can thereby automatically move into the functioning position. It can thereby be essentially guaranteed that the circumferential application of a load to the ring-shaped component can begin only when the lifting or raising force, exerted by the disengagement element, on the wear compensation mechanism is actually being applied.

In accordance with an additional advantageous feature of the present invention, the friction clutch can be designed in the form of a "pulled" clutch. On a "pulled" clutch, there is essentially no reason to fear that the contact side will change, so that in the case of a "pulled" clutch, the disengagement actuator can be designed essentially without any idle travel or play.

The automatic wear compensation mechanism can thereby be effectively located generally between the disengagement element and the clutch housing, whereby the pressure force can act in the lifting direction. This design can allow a relatively large amount of flexibility or clearance or play with regard to the location of the plate spring.

The mechanism can thereby include at least one ring-shaped component, which ring-shaped component can preferably be oriented concentric to the axis of rotation. The ring-shaped component can have circumferential partial surfaces, which partial surfaces can create an ascending gradient. The partial surfaces can interact with corresponding opposite surfaces, whereby a spring mechanism can apply a load to the partial surfaces, toward the opposite surfaces, in the circumferential direction, to thereby reduce the axial distance between the partial surfaces and the opposite surfaces. The location or orientation can be selected such that the installed position of the disengagement element, inside the clutch housing, can remain essentially constant. The ratio of the distance between the inside diameter of the contact circle on the application plate and the outside diameter of the contact circle on the application plate essentially cannot thereby have a negative effect. The ratio of distances can be approximately four to five to one, which ratio can be less favorable on a "pulled" clutch. The design featured by the present invention can essentially guarantee that, when the friction linings are worn, the radially inner terminal areas of the disengagement element can be displaced by an amount corresponding to the magnitude of the wear.

The present invention also teaches that the disengagement element can be in contact, at an intermediate diameter of the disengagement element, with the application plate. On the same side and at the outside diameter of the disengagement element, the disengagement element can be in contact with the clutch housing by means of the wear compensation mechanism and a support element. In this manner, it can essentially be guaranteed that when the friction linings are worn and when there is a decreasing pressure force of the disengagement element on the wear compensation mechanism, the compensation mechanism can make an adjustment for the wear, as a result of the reduced friction force.

The present invention also teaches that the opposite surfaces can be integrated directly into the support element, whereby the need for an additional component can essentially be eliminated.

The present invention further teaches that the plate spring can be located on the side of the disengagement element farther from the ring-shaped component. The plate spring can be designed such that the inside diameter of the plate spring can be supported on the disengagement element, and opposite the point of contact with the application plate. The outside diameter of the plate spring can be in contact with the clutch housing. The plate spring can, thus, extend approximately parallel to the disengagement element, and the plate spring can be installed in a space-saving manner.

When the word invention is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and in the event that there is more than one invention, that these inventions may be patentable and non-obvious one with respect to the other.

One aspect of the invention resides broadly in a friction clutch for a motor vehicle with automatic compensation for wear, the friction clutch comprising: a clutch housing; a clutch disc for being disposed on a transmission input shaft, the transmission input shaft having a longitudinal axis defining an axial direction parallel to the longitudinal axis, the clutch disc being axially movable along the transmission input shaft; pressure plate means for engaging and disengaging the clutch disc with a flywheel, the pressure plate means being axially movable along the transmission input shaft; the clutch disc comprising: friction linings disposed between the pressure plate means and the flywheel for contacting the flywheel and the pressure plate means upon engagement of the clutch disc; membrane spring means disposed between the clutch housing and the pressure plate means for applying pressure to the pressure plate means; a disengagement system for engaging and disengaging the clutch disc and the pressure plate means; the disengagement system for engaging and disengaging being connected at a first part of the membrane spring means; first means for supporting the membrane spring means; the first means for supporting the membrane spring means comprising means for supporting the membrane spring means with respect to a first portion of the clutch housing; the first supporting means comprising at least one fastening element; the at least one fastening element being fastened to the clutch housing; second means for supporting the membrane spring means; the second means for supporting the membrane spring means comprising means for supporting the membrane spring means with respect to the pressure plate means; the second supporting means comprising a plate spring; the plate spring having a first side and a second side; the first side of the plate spring being operatively supported by the clutch housing; the second side of the plate spring being operatively supported by the pressure plate means; the plate spring comprising means for applying a force substantially parallel to the longitudinal axis, toward the pressure plate means; wear compensation means; the membrane spring means comprising means for applying a force on the wear compensation means; the membrane spring means comprising means for reducing the force on the wear compensation means upon wear of the friction lining means; and the wear compensation means comprising means for substantially maintaining the first part of the membrane spring means substantially fixed with respect to the clutch housing upon wear of the friction linings.

Another aspect of the present invention resides broadly in a friction clutch for a motor vehicle with automatic compensation for wear, the friction clutch comprising: a clutch housing; a clutch disc for being disposed on a transmission input shaft, the transmission input shaft having a longitudinal axis defining an axial direction parallel to the longitudinal axis, the clutch disc being axially movable along the transmission input shaft; pressure plate means for engaging and disengaging the clutch disc with a flywheel, the pressure plate means being axially movable along the transmission input shaft; the clutch disc comprising: friction linings disposed between the pressure plate means and the flywheel for contacting the flywheel and the pressure plate means upon engagement of the clutch disc; membrane spring means disposed between the clutch housing and the pressure plate means for applying pressure to the pressure plate means; means for engaging and disengaging the clutch disc and the pressure plate means; the means for engaging and disengaging being connected with the membrane spring means; first means for supporting the membrane spring means; the first means for supporting the membrane spring means comprising means for supporting the membrane spring means with respect to a first portion of the clutch housing; second means for supporting the membrane spring means; the second means for supporting the membrane spring means comprising means for supporting the membrane spring means with respect to the pressure plate means; wear compensation means; the membrane spring means comprising means for applying a force on the wear compensation means; the membrane spring means comprising means for reducing the force on the wear compensation means upon wear of the friction linings; and the wear compensation means comprising means for substantially maintaining a part of the membrane spring means substantially fixed with respect to the clutch housing upon wear of the friction linings.

BRIEF DESCRIPTION OF THE DRAWINGS

The present invention is explained in greater detail below with reference to the accompanying drawings, in which:

FIG. 2 shows a detail of the friction clutch as illustrated in FIGS. 1 and 1a;

FIG. 3 shows the view, from radially inside, of the ring-shaped component with a torsion spring;

FIG. 3a shows the same view as shown in FIG. 3, only with additional components;

FIG. 3b shows a view of the clutch housing from radially outside of the opening;

FIG. 4 shows a detail of the plate spring, as well as a partial section through the opposite surfaces on the plate spring;

FIG. 4a shows the detail of view A—A as shown in FIG. 4;

DESCRIPTION OF THE PREFERRED EMBODIMENT

Figure 1:
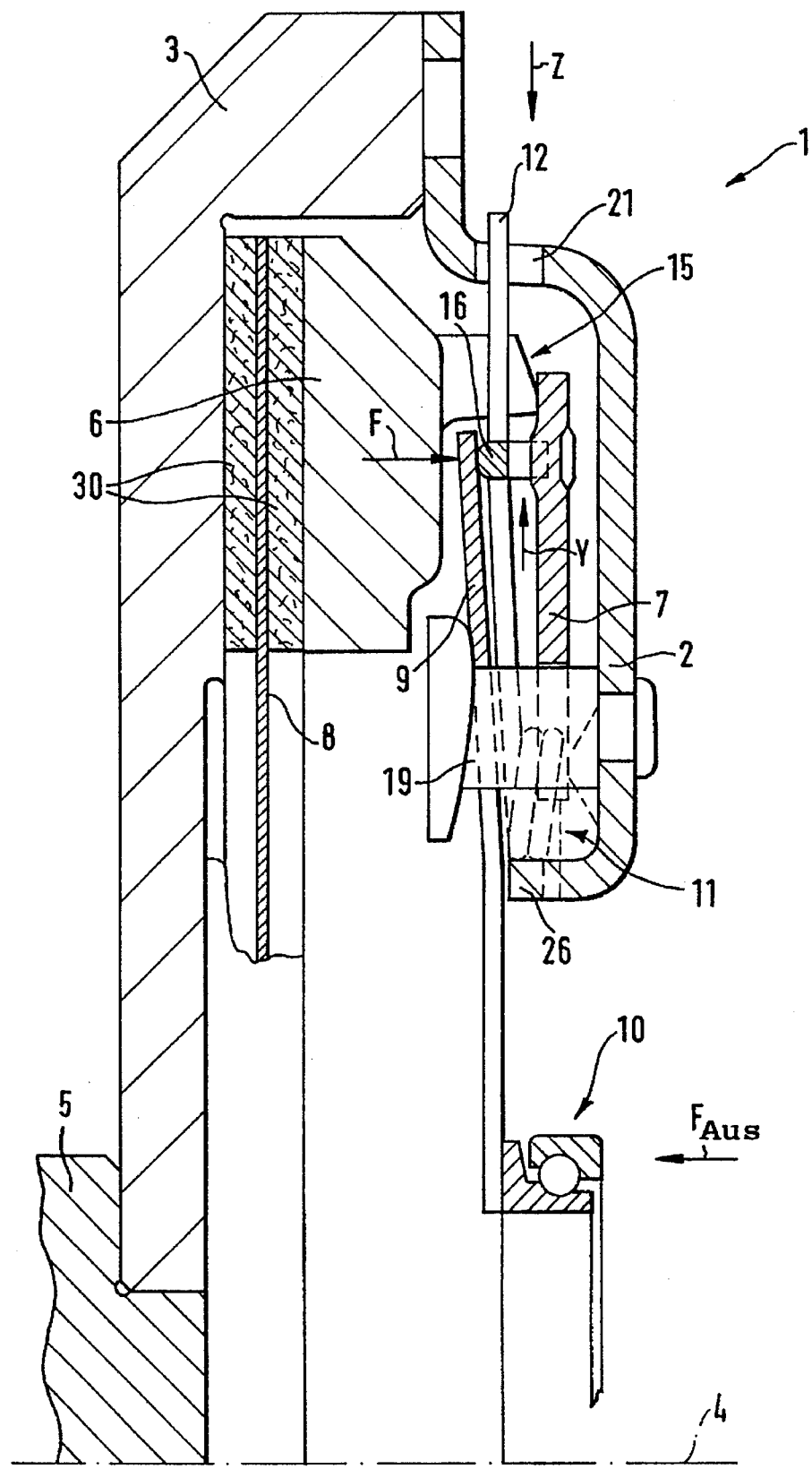
FIG. 1 shows the upper half of a longitudinal section through a "pushed" friction clutch.
Figure 1A:
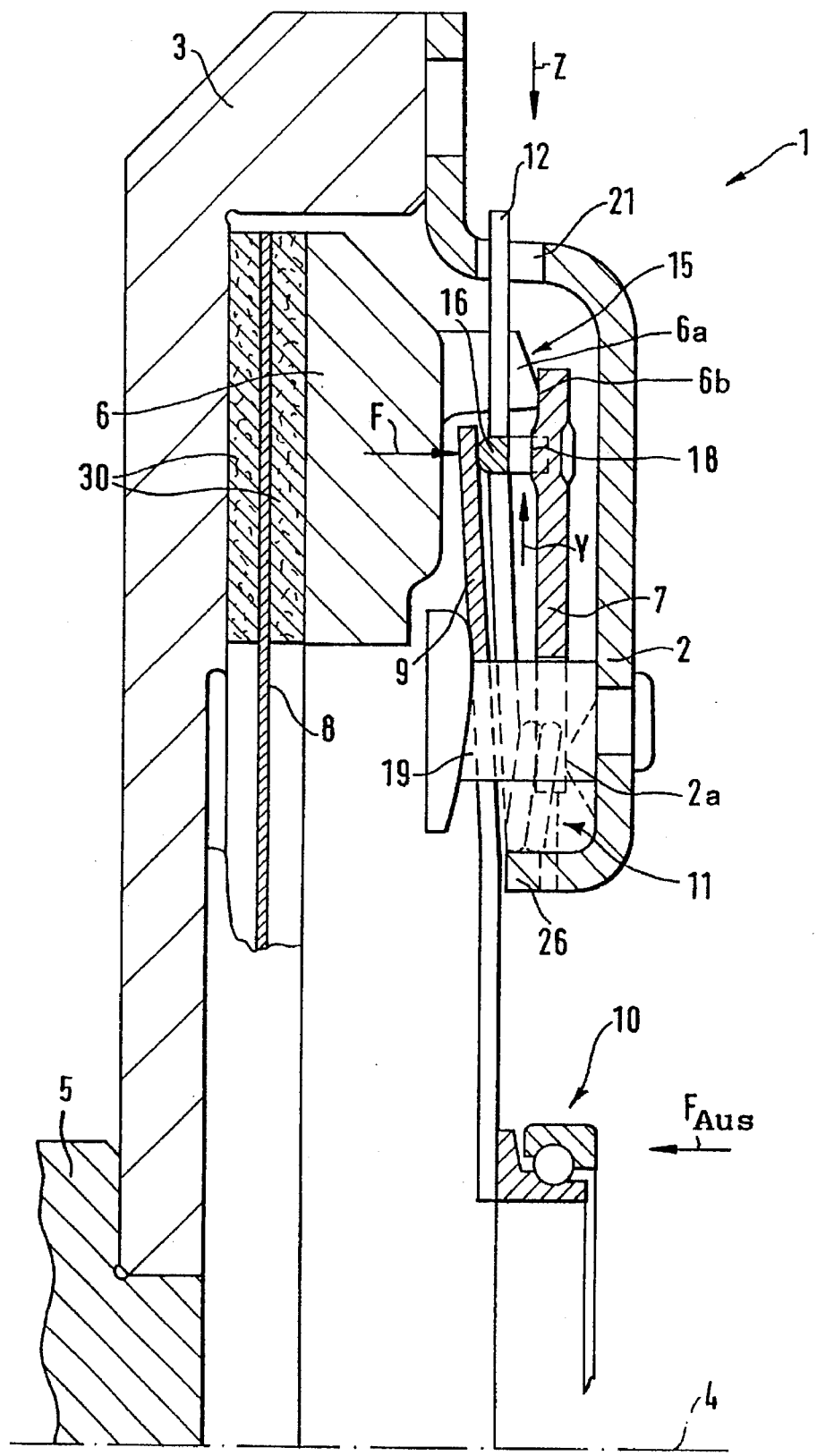
FIG. 1a shows the same view as shown in FIG. 1, only with additional components.
Figure 2:
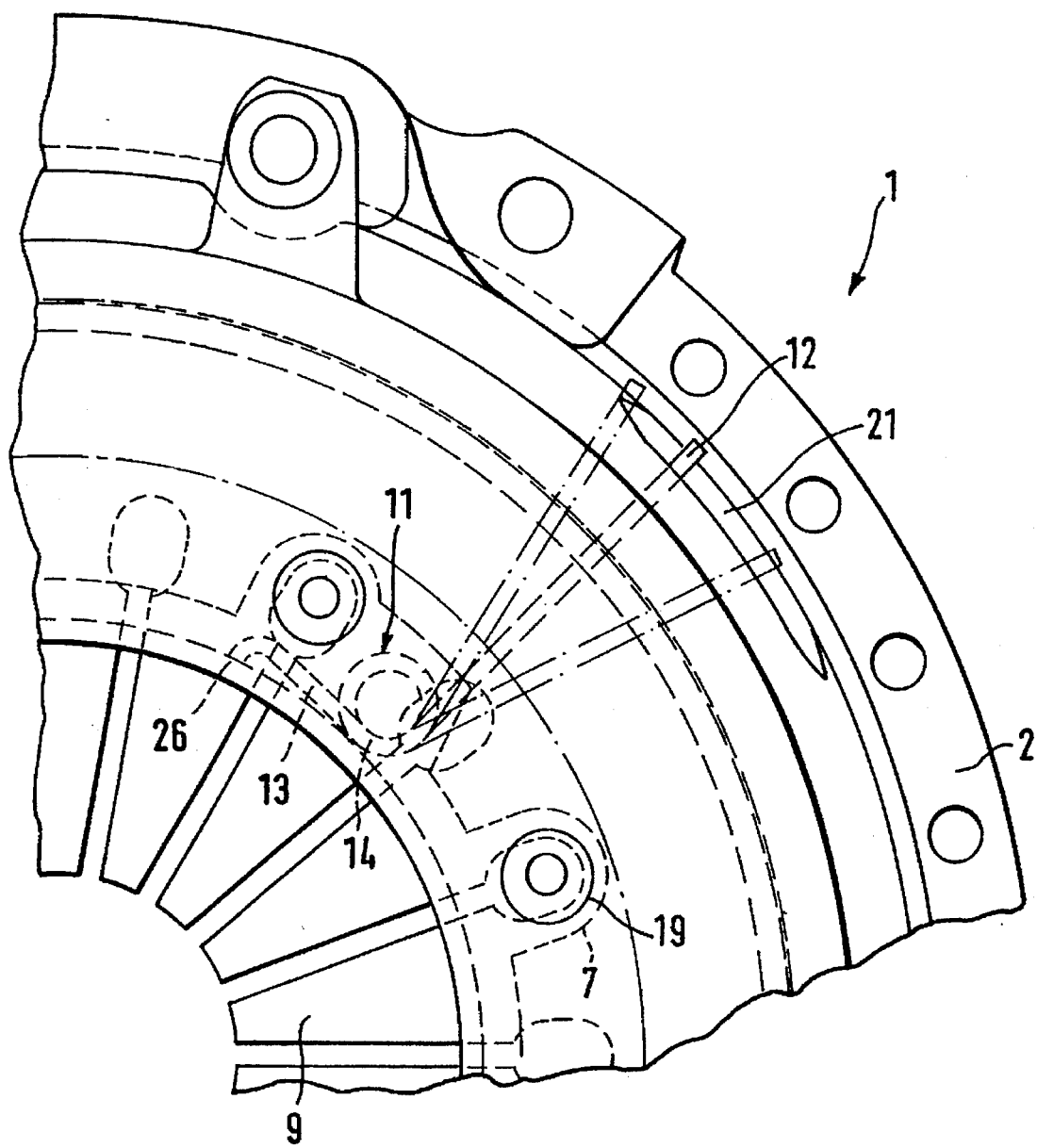

FIGS. 1 and 2 show essentially the overall construction of the friction clutch 1. The friction clutch 1 can include a flywheel 3, which flywheel 3 can be fastened to a crankshaft 5, as shown in FIGS. 1 and 1a. When the internal combustion engine is started, both the flywheel 3 and the crankshaft 5 can rotate around the axis of rotation 4. Fastened to the flywheel 3 there can be a clutch housing 2, which clutch housing 2 can contain an application plate 6. The application plate 6 can be non-rotationally connected to the clutch housing 2 such that the application plate 6 can move axially. The application plate 6 can be connected to the clutch housing 2 in a conventional manner, for example, by means of tangential leaf springs, and is therefore not illustrated in any further detail.

Between the application plate 6 and the flywheel 3, there can be a clutch plate 8, which clutch plate 8 can have friction linings 30. The clutch plate 8 can be mounted on a transmission shaft (not shown) such that the clutch plate 8 can be non-rotational, yet, such that the clutch plate 8 can be displaced axially. A force toward the flywheel 3 can be applied to the application plate 6 by a plate spring 7, whereby the plate spring 7 can be in contact, in the vicinity of the outside diameter of the plate spring 7, with support areas or bearing surfaces of the application plate 6. The plate spring 7 can also be in contact, near the inside diameter of the plate spring 7, with the clutch housing 2, by means of support areas or bearing surfaces on the clutch housing 2.

Therefore, in accordance with one embodiment of the present invention, the application plate 6 can include an extended portion 6a, which extended portion 6a can be located to radially surround a ring-shaped component 16. The extended portion 6a of the application plate 6 can have a support area 6b, as shown in FIG. 1a, which support area 6b can face toward the plate spring 7, whereby the plate spring 7 can contact the application plate 6. As a result of the contact of the plate spring 7 with the support area 2a of the clutch housing 2, as also shown in FIG. 2a, together with the contact of the plate spring 7 with the support area 6b of the application plate 6, the forces exerted by the plate spring 7, in the direction toward the flywheel 3, can permit the application plate 6 to thereby engage the clutch plate 8.

Located between the plate spring 7 and the application plate 6, there can be a disengagement element 9, which disengagement element 9 can have approximately the form of a membrane spring. In the vicinity of the outside diameter of the disengagement element 9, the disengagement element 9 can be supported on the plate spring 7, by means of a wear compensation mechanism 15.

In accordance with an embodiment of the present invention, the support of the disengagement element 9 can, alternatively, be provided directly on a corresponding area of the application plate 6.

Radially further inward, the disengagement element 9 can be supported on the clutch housing 2 by means of several spacer bolts 19, which spacer bolts 19 can be distributed around the circumference of the disengagement element 9. By fastening the spacer bolts 19 to the clutch housing 2, the spacer bolts 19 can extend through corresponding notches in both the disengagement element 9 and the plate spring 7. In the radially inner area of the disengagement element 9, there can be a disengagement bearing 10, which disengagement bearing 10 can be oriented concentric to the axis of rotation 4. A disengagement system (not shown) can apply a load to the bearing 10 in the direction of the force $F_{Aus}$ to disengage the friction clutch 1.

Therefore, in accordance with one embodiment of the present invention, the disengagement element 9 can be advantageously realized in essentially the form of a membrane spring, whereby the disengagement element 9 can have spring force characteristics to thereby facilitate the engagement and disengagement movement, as well as the adjustment for wear.

In accordance with one embodiment of the present invention, the mechanism 15 can compensate for wear and can preferably include the ring-shaped component 16. The ring-shaped component 16 can be located between the radially outer area of the disengagement element 9 and the vicinity of the radially outer area of plate spring 7. The design of this ring-shaped component 16 is illustrated in FIG. 3, in the detail of the view "Y" shown in FIG. 1. The ring-shaped component 16, on the side facing toward the plate spring 7, can have circumferentially inclined partial surfaces 17. All of the partial surfaces 17 can have essentially the same specified ascending gradient. As illustrated in FIG. 1a, on the axially opposite component—i.e. the plate spring 7, there can be corresponding opposite surfaces 18, which corresponding opposite surfaces 18 can have essentially the same ascending gradient as the partial surfaces 17. In operation, the partial surfaces 17 and the opposite surfaces 18 can preferably be supported on one another.

Alternatively, in contrast to FIGS. 1 and 1a, FIG. 3 shows that there can be a second ring-shaped component 20, which second ring-shaped component 20 can be provided with these opposite surfaces 18. The disengagement element 9 can apply an axial lifting force F to the ring-shaped components 16 and 20 which have the partial surfaces 17 and the opposite surfaces 18, respectively. When new friction linings 30 are installed on the clutch plate 8, the partial surfaces 17 and the opposite surfaces 18 can be held in frictional contact with one another, for example, as shown in FIG. 3.

In accordance with one embodiment of the present invention, therefore, the partial surfaces 17 and the opposite surfaces 18 can include essentially smooth angled surfaces. Alternatively, the partial surfaces 17 and the opposite surfaces 18 can include other than straight or smooth surfaces.

For example, the partial surfaces 17 and the opposite surfaces 18 can include matching stepped portions, whereby each of the partial surfaces 17 and the opposite surfaces 18 can be configured to include individual shoulders designed to correspond to and fit into one another.

There can preferably be several torsion springs 11 circumferentially offset with respect to the spacer bolts 19, which torsion springs 11 can be distributed around the circumference. The torsion springs 11 can assume a position similar to the position as shown in FIG. 2. The torsion springs 11 can preferably have one leg 13, starting from spring coils 14, which leg 13 can preferably be supported on the clutch housing 2, and, in particular, on an axially angled collar 26. The other leg 12 can extend generally in a radial direction, and, as shown in FIG. 3, the leg 12 can extend through an opening 25 in the ring-shaped component 16. The leg 12 can be extended radially outward such that the leg 12 can extend through an opening 21 in the clutch housing 2. Such an arrangement is illustrated in FIG. 3b, in the detail of view "Z", which view "Z" is seen from radially outside, as shown in FIGS. 1 and 1a.

In summary, in accordance with one embodiment of the present invention, the torsion springs 11 can be located essentially the same radial distance from the axis of rotation 4 as the spacer bolts 19 can be located. The torsion springs 11 can include the spring coils 14, which spring coils 14 can have extended ends forming the legs 12 and 13. The leg 13 can extend generally in a circumferential direction and, by means of the axially angled collar 26, the leg 13 can be angled toward and adjacent the clutch housing 2. The other leg 12 can extend generally in a radial direction and can extend through the opening 25a, as shown in FIG. 3a, of the ring-shaped component 16. The leg 12 can extend farther in a radially outward direction such that the end of the leg 12 can project through an opening 21 in the clutch housing 2. As also shown in FIG. 3a, the ring-shaped component 16 can have an additional opening 25b, in which opening 25b, for example, additional torsion springs 11 can be located.

There can preferably be an opening 21 for each torsion spring 11, and each opening 21 can be located in the clutch housing 2. The openings 21 can have a flywheel-side delimitation 23 and an opposite delimitation 24, as shown in FIG. 3b. The illustration of the leg 12 in FIG. 3b can be considered to represent the operational position when the friction linings 30 are essentially new.

FIGS. 4 and 4a show partial views of the plate spring 7 as illustrated in FIGS. 1 and 1a. In this system, the opposite surfaces 18 which correspond to the partial surfaces 17 of the ring-shaped component 16, can be integrated essentially directly into the plate spring 7. The profile of these opposite surfaces 18, in the circumferential direction is shown in Section A—A shown in FIG. 4a. Alternatively, these opposite surfaces 18 can be located in circumferential areas of the application plate 6, or—as shown in FIG. 3—the opposite surfaces 18 can, alternatively, be located in a second ring-shaped component 20. If, however, the opposite surfaces 18 are integrated into the plate spring 7, there is essentially no need for an additional component. As a result, there can be less individual parts required, whereby axial space can be saved.

To essentially prevent an unintentional maladjustment of the wear compensation mechanism 15 during the process of installing the friction clutch 1, as shown in FIGS. 2, 3a, and 3b, the leg 12 of the torsion spring 11, which leg 12 can extend approximately radially, can be fixed in position during the assembly process such that the leg 12 essentially cannot impart any rotational movement to the ring-shaped component 16. For this purpose, as shown in FIG. 3b, the opening 21 can be provided with a lug 22, which lug 22 can extend outward from the flywheel-side delimitation 23, toward the opposite delimitation 24, and in such a manner that the lug 22 can leave a remaining passage 21a in the opening 21. As shown in FIG. 3b, the lug 22 can be oriented counterclockwise near the circumferential terminal area of the opening 21. In the position of the leg 12 indicated by broken lines in FIG. 2, or in the position indicated by the dot-dash lines in FIG. 3b, the leg 12 can be installed with bias in contact with the lug 22.

In summary, in accordance with one embodiment of the present invention, during assembly of the friction clutch 1, for the purpose of essentially preventing the torsion springs 11 from adjusting or moving the wear compensation mechanism 15, the leg 12 of the torsion springs 11, as shown in FIG. 3b, extend radially through the opening 21 in the clutch housing 2 such that the end of the leg 12 can be biased or held by the lug 22. The lug 22 can thereby prevent the leg 12 from rotating during assembly. The lug 22, as shown in FIG. 3b, can be located adjacent one end of the opening 21 and the lug 22 can extend from the flywheel-side delimitation 23 toward, but not in contact with, the opposite delimitation 24. In this manner, there can be the passage 21a provided between the lug 22 and the opposite delimitation 24, through which passage 21a the leg 12 can pass, upon disengagement, to thereby reach the operating position of the leg 12, as shown by the unbroken lines in FIG. 3b.

During the initial actuation of tee friction clutch 1—when the disengagement force F is applied to the disengagement bearing 10—and during the movement $F_{Aus}$ of the radially outer region of the disengagement element 9 in the direction indicated by the arrow F, the leg 12 of each torsion spring 11 can be moved away from contact with the lug 22, toward the opposite delimitation 24, and each leg 12 can thereby move around the nose or lug 22 into the operating position of the leg 12, which corresponds to the shape illustrated in unbroken lines in FIG. 3b.

The friction clutch 1 can then function as follows: When the friction clutch 1 is assembled and in the engaged state, as illustrated in FIGS. 1 and 1a, the disengagement element 9 can be in contact, with a lifting force F, with the ring-shaped component 16. The disengagement element 9 can bring the partial surfaces 17 of the ring-shaped component 16 into contact with the opposite surfaces 18, of the plate spring 7. During the disengagement process, the disengagement force can be transmitted, by means of the partial surfaces 17 and the opposite surfaces 18, in this case, directly to the plate spring 7. The engagement process can occur in the opposite direction. When wear occurs on the friction linings 30 of the clutch plate 8, over time, the application plate 6 can travel toward the flywheel 3, and the application plate 6 can thus be moved away from the clutch housing 2.

This movement of the application plate 6, toward the flywheel 3, Tan be executed by the radially outer area of the disengagement element 9 and the radially outer area of the plate spring 7. As a result of the corresponding configuration, and as a result of the corresponding installation of the disengagement element 9, the force F can essentially decrease with increasing wear. When properly adjusted, and after a specified amount of wear, the lifting force F can be sharply decreased. The sharp decrease in the force F can permit the force of all the torsion springs 11, against the friction on the partial surfaces 17 and the opposite surfaces 18, to rotate the ring-shaped component 16. An axial adjustment can thereby be made between the radially outer area of the disengagement element 9 and the plate spring 7, which axial adjustment can approximately correspond to the wear travel or wear distance of the application plate 6. The ring-shaped component 16, in FIG. 1, can thereby rotate counterclockwise, as shown in FIG. 3, lower left side. Simultaneously, the leg 12 of the torsion spring 11 can move in essentially the same direction. The distance X, as shown in FIG. 3, between the ring-shaped component 16 and the corresponding opposite component 20, can thus be reduced by the extent of the wear. The disengagement element 9 can, consequently, return to its basic or original position, and the disengagement element 9 can once again exert the lifting force F, set initially on the wear compensation mechanism 15, so that essentially no further relative displacement of the partial surfaces 17 and the opposite surfaces 18 can occur.

In summary, in accordance with an embodiment of the present invention, in the engaged position of the friction clutch 1, the disengagement element 9 can be in contact with the ring-shaped component 16, by means of the lifting force F. The force F of the disengagement element 9 can thereby permit the partial surfaces 17 and the opposite surfaces 18 to be in contact with one another. During disengagement of the friction clutch 1 the force F of the disengagement element 9 can permit the leg 12 to slip around the lug 22 of the opening 21 in the clutch housing 2. Each leg 12 can thereby move into the operating position. The direction of disengagement $F_{Aus}$ can be in an opposite direction with respect to force F of the disengagement element 9. Upon wear of the friction linings 30, the application plate 6 can travel in the direction toward the flywheel 3. As a result of the corresponding installation of the disengagement element 9 and the plate spring 7, upon wear, the radially outer area of the disengagement element 9 and the radially outer area of the plate spring 7 can also travel toward the flywheel 3, whereby the lifting force F of the disengagement element 9 can be essentially decreased. Upon increased wear of the friction linings 30, the force F of the disengagement element 9 can be sharply decreased such that the force of the torsion springs 11 can essentially overcome the friction between the partial surfaces 17 and the opposite surfaces 18. When the torsion springs 11 rotate in the counterclockwise direction, the ring-shaped component 16 can thereby be rotated toward the lower left side with respect to FIG. 3 since the leg 12 can also move toward the lower left side with respect to FIG. 3. The distance X can be reduced to correspondingly compensate for the wear, thereby reducing the axial distance between the disengagement element 9 and the plate spring 7. The position of the disengagement element 9 can thus be returned to the original position with respect to the application plate 6. The force F of the disengagement element 9 can thereby exert the initial amount of force F with respect to the ring-shaped component 16 of the wear compensation mechanism 15.

Because the torsion springs 11 can attempt to adjust the axial distance between the partial surfaces 17 and the opposite surfaces 18 to the minimum distance, and this minimum distance corresponds to completely worn friction linings 30, it can be necessary to essentially guarantee the installed position and, thus, the inaction of all the torsion springs 11 during the process of assembling the friction clutch 1.

Figure 5:
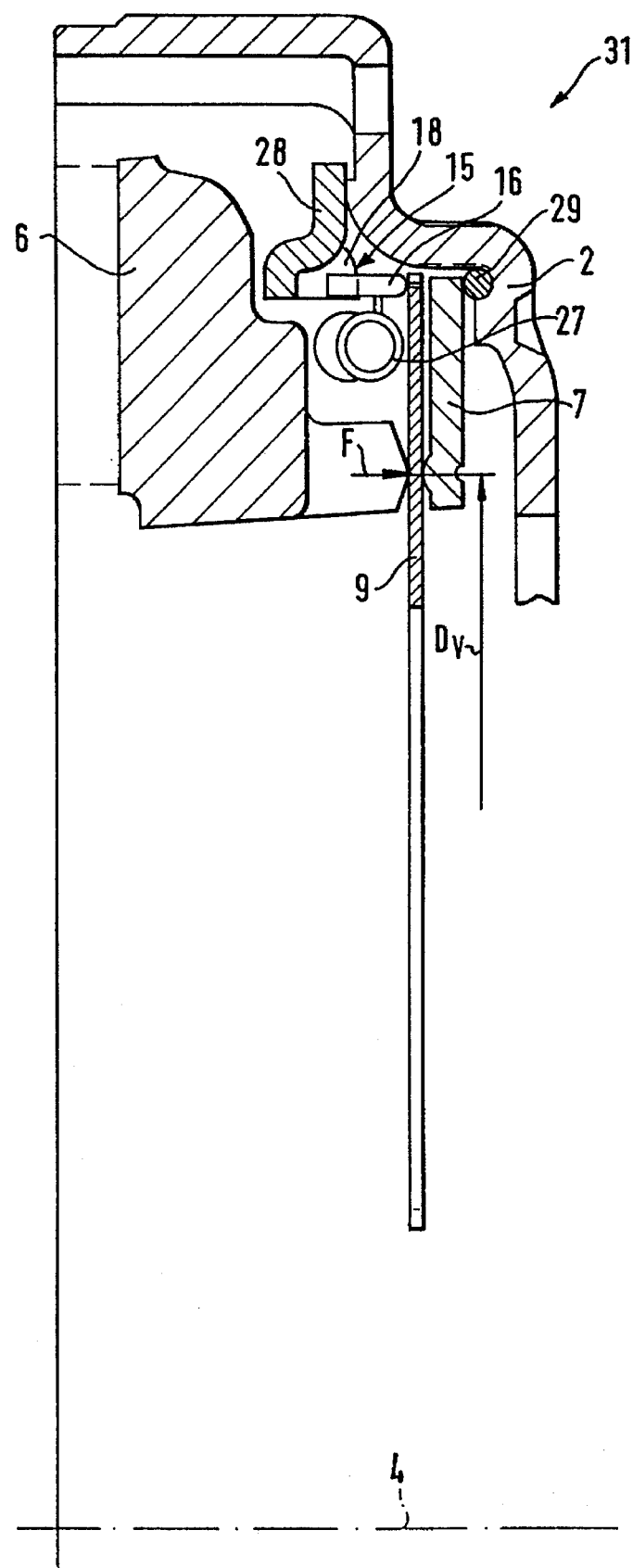
FIG. 5 shows the upper half of a longitudinal section through a "pulled" friction clutch.

The friction clutch 31 as illustrated in FIG. 5, differs from the friction clutch 1, as illustrated in FIGS. 1 and 1a, essentially in that the friction clutch 31 represents a "pulled" clutch. On a pulled clutch, the radially inner terminal portions of the disengagement element 9 can be moved away from the flywheel 3 (see FIGS. 1 and 1a) to achieve a lifting of the clutch plate 8 (see FIG. 1). In accordance with this embodiment, the application plate 6 can be located in the clutch housing 2 in a conventional manner such that the application plate 6 can be non-rotational, yet, can be displaced axially. In addition, the application plate 6 can be pushed by a plate spring 7 toward flywheel 3.

Figure 5A:
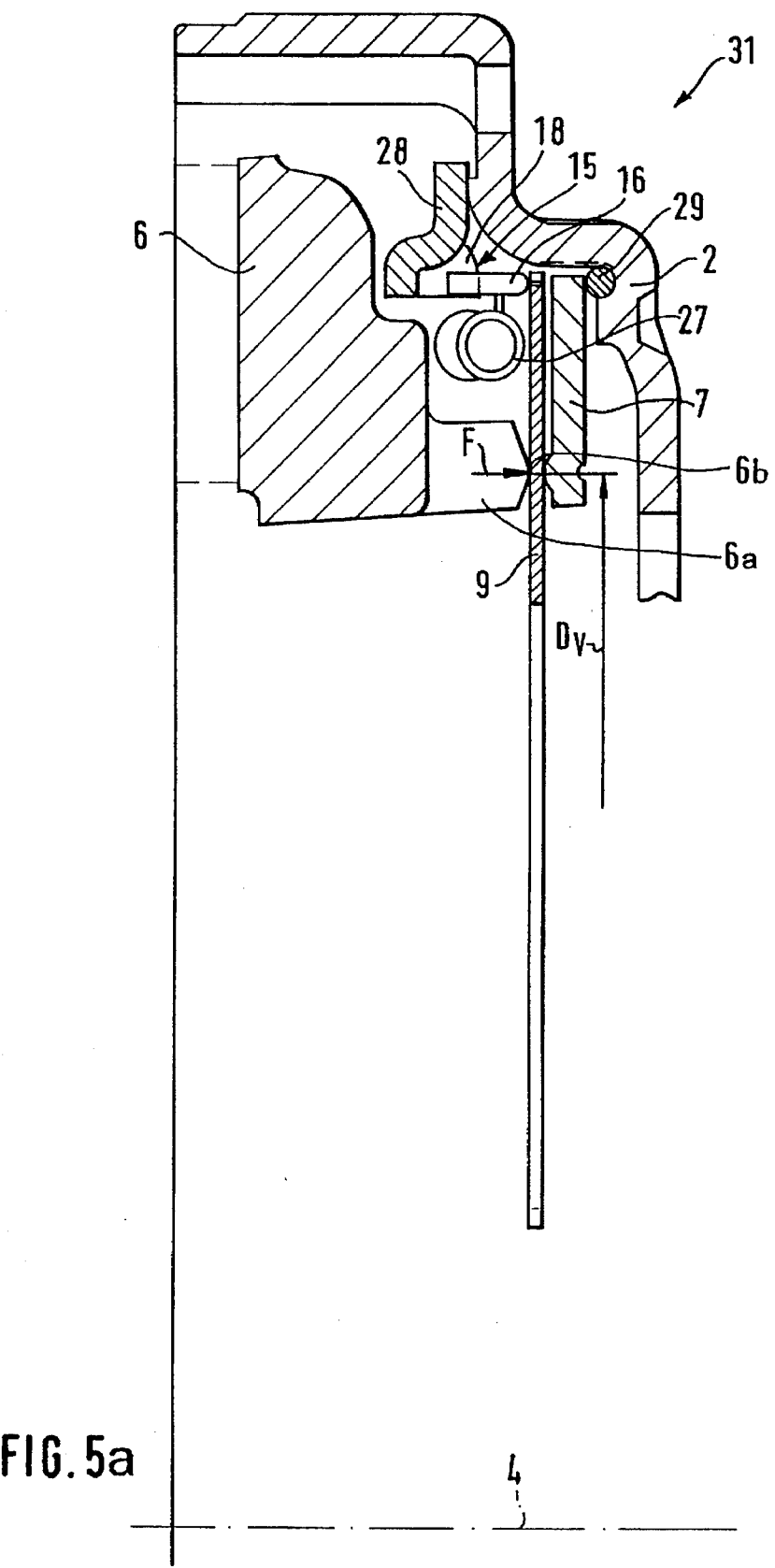
FIG. 5a shows the same view as shown in FIG. 5, but with additional components.

The outside diameter of the plate spring 7 can preferably be in contact with the clutch housing 2, e.g. by means of a support ring 29. And by means of the inside diameter of the plate spring 7, the plate spring 7 can exert a sufficient force on the application plate 6. The contact diameter of the application plate 6 with the plate spring 7 is designated Dv, as shown in FIG. 5a. The disengagement element 9 can preferably be located between the plate spring 7 and the application plate 6, which disengagement element 9 can be provided with radial slots, in the manner of a membrane spring. The disengagement element 9 can preferably have its own biasing force. The disengagement element 9 can be held in contact, by the force of the plate spring 7, against the diameter Dv on the application plate 6, as shown in FIG. 5a. And the outside diameter of the plate spring 7 can push the disengagement element 9, via the wear compensation mechanism 15, against a support element 28, which support element 28 can be non-detachably connected to the clutch housing 2.

In accordance with one embodiment of the present invention, the application plate 6, as shown in FIG. 5a, can include an extended portion 6a, which extended portion 6a can be located radially within the ring-shaped component 16. The extended portion 6a of the application plate 6 can have a contact point 6b, which contact point 6b can face toward the disengagement element 9 whereby the disengagement element 9 can contact the application plate 6, to engage the clutch plate 8, as shown in FIGS. 1 and 1a.

The mechanism 15 can include at least one ring-shaped component 16 oriented concentric to the axis of rotation 4, which ring-shaped component 16 can be in contact, by means of partial surfaces 17, as shown in FIG. 3, with corresponding opposite surfaces 18 of the support element 28. The component 16 can be spring-loaded, for example, by several tension springs 27 distributed around the circumference. As shown in FIG. 3, the springs attempt to reduce the distance X. When the friction clutch 1 is new, the disengagement element 9 can exert a force on the ring-shaped component 16. The ring-shaped component 16 can preferably be sized such that the tension springs 27 essentially cannot overcome the friction between the partial surfaces 17 and the opposite surfaces 18. With the same contact force F, the disengagement element 9 can be supported on the diameter Dv, as shown in FIG. 5a, on the plate spring 7. The clamping or fixing force of the plate spring 7 can be reduced by the pressure of force F.

In accordance with one embodiment of the present invention, therefore, the relationship of biasing forces among the plate spring 7, the support ring 29, and the disengagement element 9 can provide the support and the spring force characteristics of the disengagement element 9.

Figure 6:
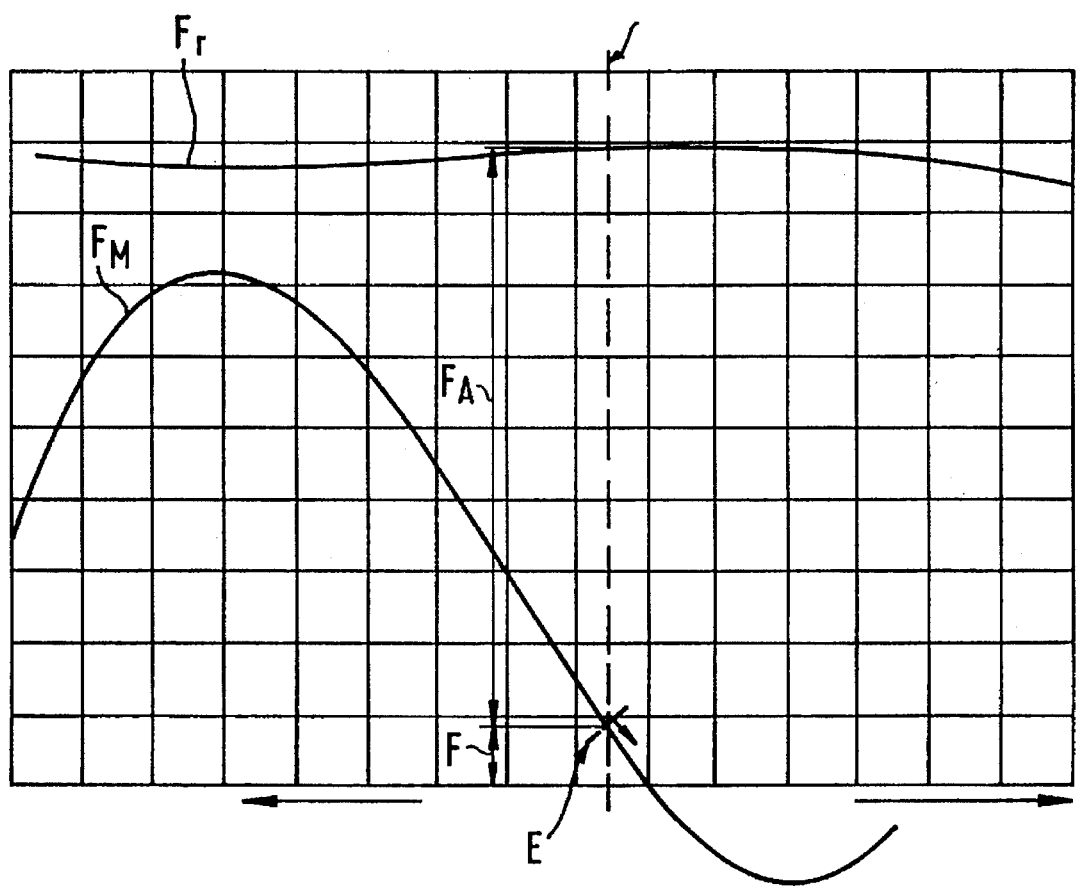
FIG. 6 shows the curve of the spring force as a function of the disengagement travel or the wear.
Figure 6A:
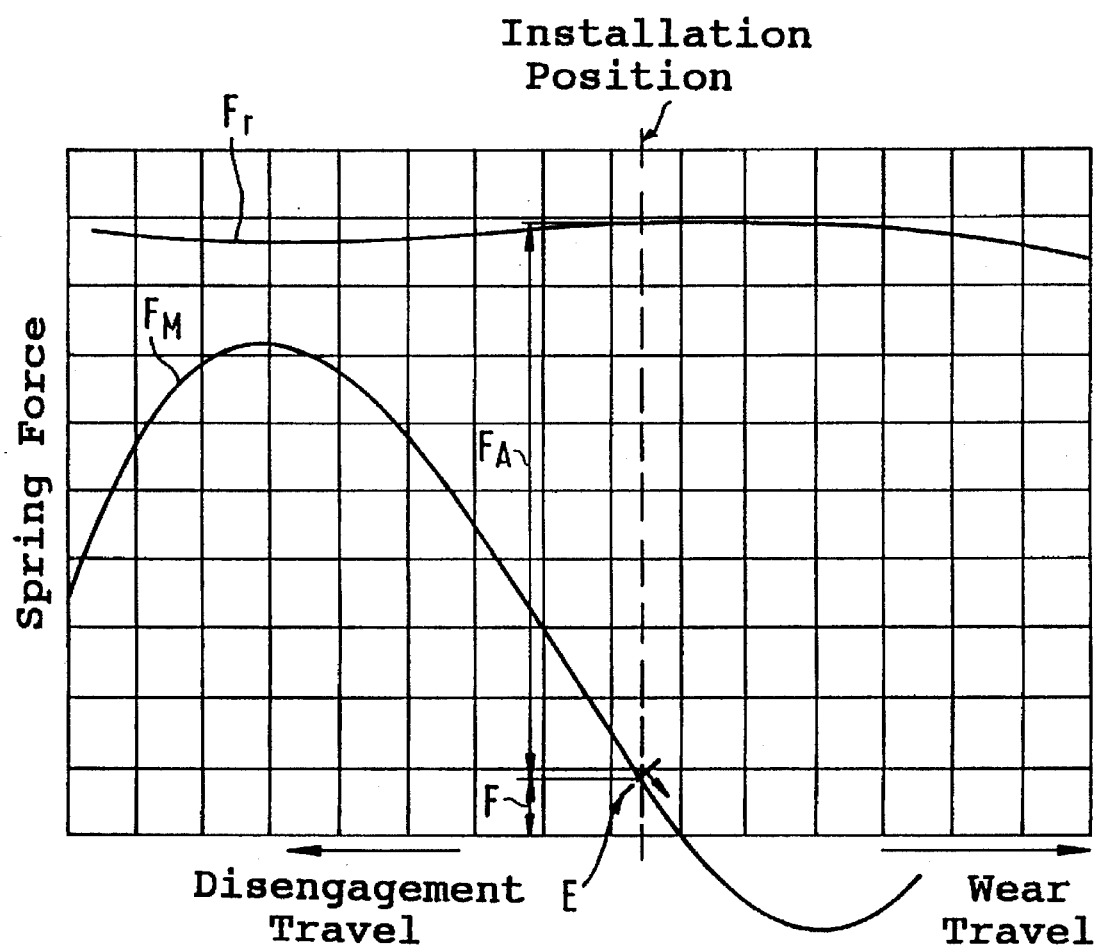
FIG. 6a shows the same view as shown in FIG. 6, but with additional components.

The function of the friction clutch 31, as illustrated in FIGS. 5 and 5a is described below in connection with the spring force curves, as illustrated in FIG. 6. The spring force curve FT, as shown in FIG. 6a, relates to the plate spring 7, which spring force curve FT can be approximately constant over large areas of the disengagement travel or of the wear travel. The curve Fm of the spring force of the disengagement element 9 can be steeply inclined in the vicinity of the installed position. In the installed position, the pressure force F of the disengagement element 9 can be set relatively low, to keep the application force, which application force can remain after the subtraction of the pressure force F from the bias of the plate spring 7, sufficiently large. Then—starting from the installed position—if there is wear on the friction linings 30, the point E can move diagonally downward to the right, with respect to FIG. 6, thereby indicating that the support force F of the disengagement element 9 can decrease sharply. By the same extent, the force exerted by the outside diameter of the disengagement element 9, on the ring-shaped component 16, can also decrease. Thus, the friction force between the partial surfaces 17 and the, opposite surfaces 18 can decrease so sharply that the tension springs 27 can rotate the ring-shaped component 16, whereby the distance X, as illustrated in FIG. 3, can be reduced. Thus, the disengagement element 9 can return to its original position, relative to the clutch housing 2. The disengagement element 9 can, however, be offset, parallel toward the flywheel, by the amount of the wear.

In accordance with one embodiment of the present invention, therefore, as shown in FIG. 6a, the spring force curve FT of the plate spring 7 can be relatively flat, whereas, the spring force characteristics of the spring force $F_M$ of the disengagement element 9 can be steeply inclined with respect to the installation position. Upon wear of the friction linings 30, however, the point E of the spring force $F_M$ of the disengagement element 9, can be influenced by the wear such that the point E can move diagonally downward to the right with respect to FIG. 6. As a result, there can be a sharp decrease in the force F of the disengagement element 9 to permit the rotation of the ring-shaped component 16. The distance X, as shown in FIGS. 3 and 3a, can thereby be reduced to adjust for the wear and the position of the disengagement element 9 can be returned to the original position relative to the application plate 6. In addition, the force $F_A$, as shown in FIGS. 6 and 6a, can be considered to represent the pressure force of the plate spring 7.

It should be noted that the clutches described above can be installed on essentially any type of flywheel, e.g. on a flywheel with two centrifugal masses.

One feature of the present invention resides broadly in the friction clutch for an internal combustion engine, comprising: a clutch housing 2 which is fastened to a flywheel 3 of an internal combustion engine and can rotate with the flywheel 3 around an axis of rotation 4, an application plate 6 which is mounted non-rotationally in the clutch housing 2, but which can move axially, a clutch plate 8 between the application plate 6 and the flywheel 3 with friction linings 30, a plate spring 7 which is supported on one side on the application plate 6 and on the other side on the housing 2, and which applies a lead to the application plate 6 in the direction of the flywheel 3 to generate an application force $F_A$, a disengagement element 9, approximately in the form of a membrane spring with slots which run radially, and which is supported on one hand with spring force on the clutch housing 2, and on the other hand is supported on the application plate, a disengagement system 10 which acts on the radially inner area of the disengagement element 9, a mechanism 15 for the automatic compensation for wear of the friction linings 30 by force-dependent adjustment or retention of the installation position of the disengagement element 9, the load pressure F of which decreases as wear occurs.

Another feature of the invention resides broadly in the friction clutch characterized by the fact that the friction clutch is in the form of a pushed clutch.

Yet another feature of the invention resides broadly in the friction clutch characterized by the fact that the mechanism 15 is effectively located between the disengagement element 9 and the application plate 6, and the contact force F is active in the lifting or disengagement direction.

Still another feature of the invention resides broadly in the friction clutch characterized by the fact that the wear compensation mechanism 15 includes at least one ring-shaped component 16 which is oriented concentric to the axis of rotation 4, with partial surfaces 17 which form a circumferential ascending gradient, and which interact with corresponding opposite surfaces 18, whereby spring mechanism torsion springs 11 apply a load to the component 16 with respect to the opposite surfaces 18 in the circumferential direction in the sense of reducing the axial distance X.

A further feature of the invention resides broadly in the friction clutch characterized by the fact that the disengagement element 9 is supported with an intermediate diameter by means of spacer bolts 19 or similar devices which are fastened to the housing 2, and is in contact in the vicinity of its outside diameter with the ring-shaped component 16.

Another feature of the invention resides broadly in the friction clutch characterized by the fact that the opposite surfaces 18 are located on another ring-shaped component 20, which for its part is supported on the application plate 6 or the plate spring 7.

Yet another feature of the invention resides broadly in the friction clutch characterized by the fact that the opposite surfaces 18 are located directly on the application plate 16.

Still another feature of the invention resides broadly in the friction clutch characterized by the fact that the opposite surfaces 18 are located directly on the plate spring 7.

A further feature of the invention resides broadly in the friction clutch characterized by the fact that the plate spring 7 is in contact with its inside diameter against the clutch housing, with its outside diameter against the application plate 6, the disengagement element 9 with an intermediate diameter by means of spacer bolts 19 also against the clutch housing 2, and with its outside diameter by means of the ring-shaped component 16 against the plate spring 7, in a diameter area which is close to and radially inside the contact between the plate spring and the application plate.

Another feature of the invention resides broadly in the friction clutch characterized by the fact that the spring mechanism includes several torsion springs 11 which are distributed around the circumference, the one leg 13 of which is supported on the clutch housing 2, and the other leg 12 of which applies a load circumferentially to the ring-shaped component 16 with the partial surfaces 17 which can be displaced rotationally with respect to the axis of rotation 4.

Yet another feature of the invention resides broadly in the friction clutch characterized by the fact that the torsion springs 11 are fixed with their spring coils 14 in the vicinity of the spacer bolts 19 for the disengagement element 9—but are circumferentially offset—and the leg 12 which applies a load to the ring-shaped component 16 is extended radially outward beyond its point of engagement with the latter, and runs through an opening 21 which has a correspondingly large circumference in the clutch housing 2, where it is held in a first position during the assembly process to take the load off the ring-shaped component 16.

Still another feature of the invention resides broadly in the friction clutch characterized by the fact that the leg 12 is held in place by means of a lug 22 in the opening 21, which runs from the flywheel-side delimitation 23 of the opening 21 in the axial direction toward the opposite delimitation 24, whereby on the occasion of the, initial actuation of the clutch, the leg 12 of the torsion spring 11 snaps over the lug 22 and automatically moves into the functioning position.

A further feature of the invention resides broadly in the friction clutch characterized by the fact that the friction clutch is designed as a pulled clutch.

Another feature of the invention resides broadly in the friction clutch characterized by the fact that the mechanism 15 is effectively located between the disengagement element 9 and the housing 2, and the pressure force F acts in the lifting direction.

Yet another feature of the invention resides broadly in the friction clutch characterized by the fact that the mechanism 15 consists of at least one ring-shaped component 16 which is concentric with the axis of rotation 4, with partial circumferential surfaces 17 which form an ascending gradient, and which interact with corresponding opposite surfaces 18, whereby a spring mechanism tension springs 27 apply a load to the partial surfaces 17 toward the opposite surfaces 18 in the circumferential direction, to reduce the axial distance X.

Still another feature of the invention resides broadly in the friction clutch characterized by the fact that the disengagement element 9 is in contact with an intermediate diameter D on the application plate 6, and is in contact with its outside diameter with the housing on the same side by means of the mechanism 15 and a support element 28.

A further feature of the invention resides broadly in the friction clutch characterized by the fact that the opposite surfaces 18 are integrated directly into the supporting element 28.

Another feature of the invention resides broadly in the friction clutch characterized by the fact that the plate spring 7 on the side of the disengagement element 9 farther from the ring-shaped component 16, is in contact with the disengagement element 9 by means of its inside diameter, and namely opposite the contact with on the application plate 6, and is in contact by means of its outside diameter on the clutch housing 2.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

Types of clutch assemblies which have wear sensors or adjustment mechanisms for detecting and adjusting for the wear of the friction linings of a clutch may be disclosed by the following U.S. Pat. No. 4,191,285 to Thelander et al. on Mar. 4, 1980, entitled "Wear Compensator for Belleville Spring Clutch"; U.S. Pat. No. 5,238,093 to Campbell on Aug. 24, 1993, entitled "Wear Indicator for Adjustable Clutch"; U.S. Pat. No. 4,953,680 to Flotow on Sep. 4, 1990, entitled "Clutch Adjuster"; U.S. Pat. No. 4,549,643 to Flotow et al. on Oct. 29, 1985, entitled "Self Adjusting Device for a Friction Clutch"; U.S. Pat. No. 4,310,086 to Mochida on Jan. 12, 1982, entitled "Automatic Adjusting Device for a Clutch Operating Mechanism"; and U.S. Pat. No. 4,285,424 to Sink et al. on Aug. 25, 1981, entitled "Locking Device for a Friction Type Clutch".

Types of manual transmissions in which the present invention may be incorporated may be disclosed by the following U.S. Pat. No. 5,036,721 to Gugin on Aug. 6, 1991, entitled "Shift Control Mechanism for a Manual Transmission"; U.S. Pat. No. 4,222,283 to Nagy on Sep. 16, 1980, entitled "Manual Transmission Lubrication System"; U.S. Pat. No. 3,858,460 to Porter et al. on Jan. 7, 1975, entitled "Four Speed Manual Transmission and Control"; and U.S. Pat. No. 5,269,400 to Fogelberg on Dec. 14, 1993, entitled "Transmission Synchronizer".

Types of clutch assemblies in which the present invention may be incorporated may be disclosed by the following U.S. Pat. No. 4,635,780 to Wiggen on Jan. 13, 1987, entitled "Clutch Disc for a Motor Vehicle Friction Clutch"; U.S. Pat. No. 4,684,007 to Maucher on Aug. 4, 1987, entitled "Clutch Plate"; U.S. Pat. No. 4,433,771 to Caray on Feb. 28, 1984, entitled "Torsion Damping Device for a Clutch Plate"; and U.S. Pat. No. 4,099,604 to Higgerson on Jul. 11, 1978, entitled "Friction Clutch with Integral Adjuster".

Examples of friction clutches with adjustment for wear, having components that may be utilized in accordance with the embodiments of the present invention, may be found in Federal Republic of Germany Patent No. P 12 94 229.

The corresponding foreign patent publication applications, namely, Federal Republic of Germany Patent Application No. P 44 36 111.4, filed on Oct. 10, 1994, having inventor Reinhold Weidinger, and DE-OS P 44 36 111.4 and DE-PS P 44 36 111.4, as well as their published equivalents, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a motor vehicle with automatic compensation for wear, said friction clutch comprising:

a clutch housing;

a clutch disc for being disposed on a transmission input shaft, the transmission input shaft having a longitudinal axis defining an axial direction parallel to the longitudinal axis, said clutch disc being axially movable along the transmission input shaft;

pressure plate means for engaging and disengaging said clutch disc with a flywheel, said pressure plate means being axially movable along the transmission input shaft;

said clutch disc comprising:
friction lining means disposed between said pressure plate means and the flywheel for contacting the flywheel and said pressure plate means upon engagement of said clutch disc;

membrane spring means disposed between said clutch housing and said pressure plate means for applying pressure to said pressure plate means;

a disengagement system for engaging and disengaging said clutch disc and said pressure plate means;

said disengagement system for engaging and disengaging being connected at a first part of said membrane spring means;

first means for supporting said membrane spring means;

said first means for supporting said membrane spring means comprising means for supporting said membrane spring means with respect to a first portion of said clutch housing;

said first supporting means comprising at least one fastening element;

said at least one fastening element being fastened to said clutch housing;

second means for supporting said membrane spring means;

said second means for supporting said membrane spring means comprising means for supporting said membrane spring means with respect to said pressure plate means;

said second means for supporting said membrane spring means comprising a plate spring;

said plate spring having a first side and a second side;

said first side of said plate spring being operatively supported by said clutch housing;

said second side of said plate spring being operatively supported by said pressure plate means;

said plate spring comprising means for applying a force substantially parallel to said longitudinal axis, toward said pressure plate means;

wear compensation means;

said membrane spring means comprising means for applying a force on said wear compensation means;

said membrane spring means comprising means for reducing the force on said wear compensation means upon wear of said friction lining means;

said wear compensation means comprising means for substantially maintaining said first part of said membrane spring means substantially fixed with respect to said clutch housing upon wear of said friction lining means;

said wear compensation means being disposed adjacent and in contact with said membrane spring means;

said wear compensation means comprising at least one ring portion;

said at least one ring portion being disposed concentrically with respect to said longitudinal axis;

said membrane spring means having an outer circumferential portion;

said outer circumferential portion of said membrane spring means being disposed adjacent and in contact with said at least one ring portion;

said first side of said plate spring being disposed toward said at least one ring portion;

said second side of said plate spring being disposed opposite said first side of said plate spring, and facing away from said at least one ring portion;

said first side of said plate spring comprising a first surface;

said second side of said plate spring comprising a second surface;

each of said first surface and said second surface of said plate spring being disposed to lie in a plane, each said plane being perpendicular to said longitudinal axis;

said plate spring having an outer circumference;

said at least one ring portion comprising a first ring portion and a portion of said plate spring;

said portion of said plate spring comprising a portion being disposed at a substantial angle with respect to said plane of said first surface and said second surface of said plate spring;

said portion of said plate spring being disposed in said first surface and said second surface of said plate spring;

said portion of said plate spring comprising an undulation;

said undulation being formed concentrically within said outer circumference of said plate spring;

said undulation having a first surface and a second surface;

said first surface and said second surface of said undulation being disposed substantially parallel to one another; and said first surface and said second surface of said undulation being disposed at a substantial angle with respect to said plane of said first surface and said second surface of said plate spring.

2. Friction clutch according to claim 1, wherein the friction clutch is in the form of a pushed clutch.

3. Friction clutch according to claim 2, wherein:

said wear compensation means is effectively located between said membrane spring means and said pressure plate means; and said membrane spring means is disposed to apply a force substantially parallel with the longitudinal axis towards said plate spring during a disengagement of said friction clutch.

4. A friction clutch for a motor vehicle with automatic compensation for wear, said friction clutch comprising:

a clutch housing;

a clutch disc for being disposed on a transmission input shaft, the transmission input shaft having a longitudinal axis defining an axial direction parallel to the longitudinal axis, said clutch disc being axially movable along the transmission input shaft;

pressure plate means for engaging and disengaging said clutch disc with a flywheel, said pressure plate means being axially movable along the transmission input shaft;

said clutch disc comprising:

friction lining means disposed between said pressure plate means and the flywheel for contacting the flywheel and said pressure plate means upon engagement of said clutch disc;

membrane spring means disposed between said clutch housing and said pressure plate means for applying pressure to said pressure plate means;

a disengagement system for engaging and disengaging said clutch disc and said pressure plate means;

said disengagement system for engaging and disengaging being connected at a first part of said membrane spring means;

first means for supporting said membrane spring means;

said first means for supporting said membrane spring means comprising means for supporting said membrane spring means with respect to a first portion of said clutch housing;

said first supporting means comprising at least one fastening element;

said at least one fastening element being fastened to said clutch housing;

second means for supporting said membrane spring means;

said second means for supporting said membrane spring means comprising means for supporting said membrane spring means with respect to said pressure plate means;

said second means for supporting said membrane spring means comprising a plate spring;

said plate spring having a first side and a second side;

said first side of said plate spring being operatively supported by said clutch housing;

said second side of said plate spring being operatively supported by said pressure plate means;

said plate spring comprising means for applying a force substantially parallel to said longitudinal axis, toward said pressure plate means;

wear compensation means;

said membrane spring means comprising means for applying a force on said wear compensation means;

said membrane spring means comprising means for reducing the force on said wear compensation means upon wear of said friction lining means;

said wear compensation means comprising means for substantially maintaining said first part of said membrane spring means substantially fixed with respect to said clutch housing upon wear of said friction lining means;

said wear compensation means being disposed adjacent and in contact with said membrane spring means;

said wear compensation means comprising at least one ring portion;

said at least one ring portion being disposed concentrically with respect to said longitudinal axis;

said membrane spring means having an outer circumferential portion;

said outer circumferential portion of said membrane spring means being disposed adjacent and in contact with said at least one ring portion;

said at least one fastening element comprises a plurality of bolts;

said membrane spring means being supported with an intermediate diameter by said plurality of bolts;

said plurality of bolts being fastened to said clutch housing;

said outer circumferential portion of said membrane spring means comprising an outside diameter;

said membrane spring means being in contact in the vicinity of said outside diameter of said membrane spring means with said at least one ring portion.

5. Friction clutch according to claim 4, wherein:

said plate spring comprises an inside diameter and an outside diameter;

said plate spring is in contact with its inside diameter against said clutch housing and is in contact with said outside diameter against said pressure plate means;

said membrane spring means with said intermediate diameter by means of said plurality of bolts is also against said clutch housing; and said membrane spring means with said outside diameter by means of said at least one ring portion is against said plate spring, in a diameter area which is close to and radially inside the contact between said plate spring and said pressure plate means.

6. Friction clutch according to claim 5, wherein:

said at least one ring portion is displaceable rotationally with respect to the axis of rotation;

said at least one ring portion comprises a plurality of partial surfaces;

said wear compensation means comprises a plurality of torsion springs;

said plurality of torsion springs are distributed around the circumference of said wear compensation means;

each of said plurality of torsion springs comprises one leg and an other leg;

each said one leg of said plurality of torsion springs is supported on said clutch housing and each said other leg of said plurality of torsion springs applies a load circumferentially to said at least one ring portion.

7. Friction clutch according to claim 6, wherein:

each of said plurality of torsion springs comprises a spring coil;

said plurality of torsion springs are fixed with their spring coils in the vicinity of said plurality of bolts for said membrane spring means;

each of said plurality of torsion springs are circumferentially offset from a corresponding one of said plurality of bolts;

each said other leg of said plurality of torsion springs applies a load to said at least one ring portion is extended radially outward beyond its point of engagement with said at least one ring portion; and each said other leg of said plurality of torsion springs runs through an a corresponding opening which has a correspondingly large circumference in said clutch housing, where it is held in a first position during the assembly process to take the load off said at least one ring portion.

8. Friction clutch according to claim 7, wherein each said other leg of said plurality of torsion springs is held in place by means of a lug in each of said corresponding openings;

each said lug runs from a flywheel-side delimitation of said corresponding opening in the axial direction toward an opposite delimitation, whereby on the occasion of the initial actuation of the clutch, each said other leg of said plurality of torsion springs snaps over said corresponding lug and automatically moves into the functioning position.

9. A friction clutch for a motor vehicle with automatic compensation for wear, said friction clutch comprising:

a clutch housing;

a clutch disc for being disposed on a transmission input shaft, the transmission input shaft having a longitudinal axis defining an axial direction parallel to the longitudinal axis, said clutch disc being axially movable along the transmission input shaft;

pressure plate means for engaging and disengaging said clutch disc with a flywheel, said pressure plate means being axially movable along the transmission input shaft;

said clutch disc comprising:

friction lining means disposed between said pressure plate means and the flywheel for contacting the flywheel and said pressure plate means upon engagement of said clutch disc;

membrane spring means disposed between said clutch housing and said pressure plate means for applying pressure to said pressure plate means;

a disengagement system fox engaging and disengaging said clutch disc and said pressure plate means;

said disengagement system for engaging and disengaging being connected at a first part of said membrane spring means;

first means for supporting said membrane spring means;

said first means for supporting said membrane spring means comprising means for supporting said membrane spring means with respect to a first portion of said clutch housing;

said first supporting means comprising at least one fastening element;

said at least one fastening element being fastened to said clutch housing;

second means for supporting said membrane spring means;

said second means for supporting said membrane spring means comprising means for supporting said membrane spring means with respect to said pressure plate means;

said second supporting means comprising a plate spring;

said plate spring having a first side and a second side;

said first side of said plate spring being operatively supported by said clutch housing;

said second side of said plate spring being operatively supported by said pressure plate means;

said plate spring comprising means for applying a force substantially parallel to said longitudinal axis, toward said pressure plate means;

wear compensation means;

said membrane spring means comprising means for applying a force on said wear compensation means;

said membrane spring means comprising means for reducing the force on said wear compensation means upon wear of said friction lining means;

said wear compensation means comprising means for substantially maintaining said first part of said membrane spring means substantially fixed with respect to said clutch housing upon wear of said friction lining means;

said wear compensation means being disposed adjacent and in contact with said membrane spring means;

said wear compensation means comprising at least one ring portion;

said at least one ring portion being disposed concentrically with respect to said longitudinal axis;

said membrane spring means having an outer circumferential portion;

said outer circumferential portion of said membrane spring means being disposed adjacent and in contact with said at least one ring portion;

said friction clutch being designed as a pulled clutch;

said wear compensation means being effectively located between said membrane spring means and said clutch housing; and said membrane spring means being disposed to apply a force substantially parallel with the longitudinal axis towards said plate spring during a disengagement of said friction clutch.

10. Friction clutch according to claim 9, wherein:

said at least one ring shaped portion comprises a plurality of surfaces;

said wear compensation means comprises at least one ring-shaped component which is concentric with the axis of rotation;

said at least one ring-shaped component comprises partial circumferential surfaces which form an ascending gradient, and which interact with corresponding opposite surfaces of said at least one ring shaped portion;

said at least one ring-shaped component and said at least one ring shaped portion together comprise a width dimension substantially parallel to the axis of rotation;

a spring mechanism applies a load to said partial circumferential surfaces toward said corresponding opposite surfaces (18) in the circumferential direction, to reduce said width dimension.

11. Friction clutch according to claim 10, wherein said membrane spring means is in contact with an intermediate diameter on said pressure plate means and is in contact with its outside diameter with said clutch housing on the same side by means of said wear compensation means and a support element.

12. Friction clutch according to claim 11, wherein said opposite surfaces are integrated directly into said support element.

13. Friction clutch according to claim 12, wherein:

said plate spring comprises an inside diameter and an outside diameter;

said plate spring on the side of said membrane spring means farther from said at least one ring-shaped component, is in contact with said membrane spring means by means of said inside diameter, and namely opposite the contact with said pressure plate means, and is in contact by means of said outside diameter on said clutch housing.

* * * * *

UNITED STATES PATENT AND TRADEMARK OFFICE
CERTIFICATE OF CORRECTION

PATENT NO. : 5,645,152
DATED : July 8, 1997
INVENTOR(S) : Reinhold Weidinger

It is certified that error appears in the above-identified patent and that said Letters Patent is hereby corrected as shown below:

In column 3, line 8, after 'a', delete "lead" and insert --load--.

In column 9, line 57, after '3,', delete "Tan" and insert --can--.

In column 11, line 14, after 'designated', delete "Dv," and insert --$D_V$--.

In column 11, line 22, after 'diameter', delete "Dv" and insert --$D_V$--.

UNITED STATES PATENT AND TRADEMARK OFFICE
CERTIFICATE OF CORRECTION

PATENT NO.  : 5,645,152
DATED       : July 8, 1997
INVENTOR(S) : Reinhold Weidinger It is certified that error appears in the above-identified patent and that said Letters Patent is hereby corrected as shown below:

In column 11, line 52, after 'diameter', delete "Dv," and insert --$D_V$--.

In column 11, line 67, after 'curve', delete "Fm" and insert --$F_M$--.

In column 19, line 63, Claim 9, after 'system', delete "Fox" and insert --for--.

Signed and Sealed this

Ninth Day of December, 1997

Attest:

BRUCE LEHMAN

*Attesting Officer*   Commissioner of Patents and Trademarks